(12) United States Patent
Schlansker et al.

(10) Patent No.: US 7,725,556 B1
(45) Date of Patent: May 25, 2010

(54) COMPUTER SYSTEM WITH CONCURRENT DIRECT MEMORY ACCESS

(75) Inventors: Michael S. Schlansker, Los Altos, CA (US); Erwin Oertli, Mountain View, CA (US); Norm Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 11/553,953

(22) Filed: Oct. 27, 2006

(51) Int. Cl.
*G06F 15/167* (2006.01)
*G06F 15/173* (2006.01)
*G06F 3/00* (2006.01)
*G06F 13/00* (2006.01)

(52) U.S. Cl. .......................... 709/212; 709/223; 710/29; 710/32

(58) Field of Classification Search .................. 709/212, 709/223–224, 232, 234, 235, 250; 714/747–751; 370/229–231, 235, 236; 710/29, 32, 52
See application file for complete search history.

(56) References Cited

U.S. PATENT DOCUMENTS

| | | | |
|---|---|---|---|
| 6,427,173 B1 | 7/2002 | Boucher et al. | |
| 6,717,910 B1 * | 4/2004 | Kasper et al. | 370/229 |
| 6,735,662 B1 | 5/2004 | Connor | |
| 6,754,179 B1 * | 6/2004 | Lin | 370/235 |
| 6,975,626 B1 | 12/2005 | Eberle et al. | |
| 7,072,294 B2 * | 7/2006 | Kasper et al. | 370/229 |
| 7,307,998 B1 * | 12/2007 | Wang et al. | 370/412 |
| 7,454,787 B2 * | 11/2008 | Hyser | 726/16 |
| 7,502,884 B1 * | 3/2009 | Shah et al. | 710/316 |
| 2005/0149632 A1 * | 7/2005 | Minami et al. | 709/237 |
| 2005/0204058 A1 | 9/2005 | Philbrick et al. | |
| 2006/0034275 A1 | 2/2006 | Roberts et al. | |

OTHER PUBLICATIONS

Kurz, Bernd; Al-Zoman, Abdulaziz; DeDourek, John; "Automatic Retransmission Rather Than Automatic Repeat Request" Oct. 1994, 2994 International Conf on Network Protocols, pp. 48-55.*

M. Katevenis, D. Serpanos, and E. Spyridakis, "Credit-flow-controlled ATM versus wormhole routing," Technical Report FORTH-ICS/TR-171, Jul. 1996, pp. 1-28, Crete, Greece.

H. T. Kung, T. Blackwell, and A. Chapman, "Credit-based flow control for ATM networks. Credit update protocol, adaptive credit allocation, and statistical multiplexing," SIGCOMM 94, pp. 101-114, London, England.

C. Kosak et al., "Buffer management and flow control in the credit net ATM host interface," IEEE, 1995, pp. 370-378, School of Computer Science, Carnegie Mellon University, Pittsburgh, PA.

R. Jain, "Congestion control and traffic management in ATM networks: recent advances and a survey," Department of Computer and Information Science, The Ohio State University, Aug. 1996, pp. 1-26.

* cited by examiner

*Primary Examiner*—Nathan Flynn
*Assistant Examiner*—Joshua Joo

(57) ABSTRACT

A computer system with concurrent direct memory access is provided including a computer node having a processor interface bus and a cut-through network interface controller installed on the processor interface bus. A data transfer is initiated through the cut-through network interface controller by starting a direct memory access to move data from a memory to a transmit buffer in the cut-through network interface controller and a network interface controller physical interface transmitting the data, to the computer node attached to a reliable network, before all of the data is in the transmit buffer.

14 Claims, 3 Drawing Sheets

COMPUTER SYSTEM WITH CONCURRENT DIRECT MEMORY ACCESS

CROSS-REFERENCE TO RELATED APPLICATION

The present application contains subject matter related to a concurrently filed application by Michael Schlansker and Erwin Oertli entitled "Virtual Network Interface System with Memory Management". The related application is identified by application Ser. No. 11/553,976 and is assigned to Hewlett-Packard Development Company, LP.

TECHNICAL FIELD

The present invention relates generally to network interface controllers, and more particularly to a system for network interface transmission with enhanced direct memory access operation.

BACKGROUND ART

Computer networks are an increasingly important part of both private and business environments. Computing devices such as workstations, personal computers, server computers, storage devices, firewalls and other computing devices function as nodes of a network with at least one network element connecting the computing devices. The various nodes transmit and/or receive various kinds of information over the network. Computing devices and users are demanding higher communication speeds across networks as more and more information flows across the various networks. The introduction of new technologies will likely load down networks even more.

The state of the art in high speed data access on computer networks has in large part been driven by exponential growth in the Internet and e-commerce. Furthermore, as computers become more powerful, applications are always being developed which take advantage of any increase in computer performance. Often, these applications utilize networks, both local and global.

It is becoming increasingly important to keep pace with the increased demands for network services by the general public. This can be accomplished by removing the bottlenecks that inhibit data transfer across computer networks because the thirst for increased bandwidth is ever present. Internet users are becoming ubiquitous as home users and businesses tap into the resources of the information superhighway. Electronic mail, which is fast becoming the preferred method of communication in business as well as in the private sector, and new business models, such as the Virtual Office, rely on computer networks for their very existence. In essence, the demand for computer networking connectivity and bandwidth is large, and growing larger all the time.

In an effort to keep up with increasing network connectivity and bandwidth demands, makers of networking hardware and software, as well as the Information Services (IS) managers that operate computer networks are continually looking for ways to improve network connectivity and bandwidth, while reducing network traffic latency.

Increasingly, computer networks are being called upon to carry time-critical telecommunications and video data streams. Guaranteed bandwidth to residential communications ports that carry voice, video and data has increased from tens of kilobits/second to Megabits/second levels. Commercial communications bandwidth has increased to several Megabits/second guaranteed bandwidth per port. However, the infrastructure that enables Wide and Local Area Networks to operate is comprised of installed network gear that is running industry standard network protocols that are not well-suited for the performance demands of time-critical, latency-intolerant network traffic such as voice and video.

Thus, a need still remains for a computer system with concurrent direct memory access that can help to reduce the latency of the network. In view of the ever increasing demand for faster network response, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The present invention provides a computer system with concurrent direct memory access which includes a computer node having a processor interface bus with a cut-through network interface controller carefully positioned on the processor interface bus of the computer node. A data transfer initiated through the cut-through network interface controller includes a direct memory access to move the data from a memory to a transmit buffer in the cut-through network interface controller and a network interface controller physical interface starts transmitting the data, to the computer node attached to a reliable network, before all of the data is in the transmit buffer.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION

Figure 1:
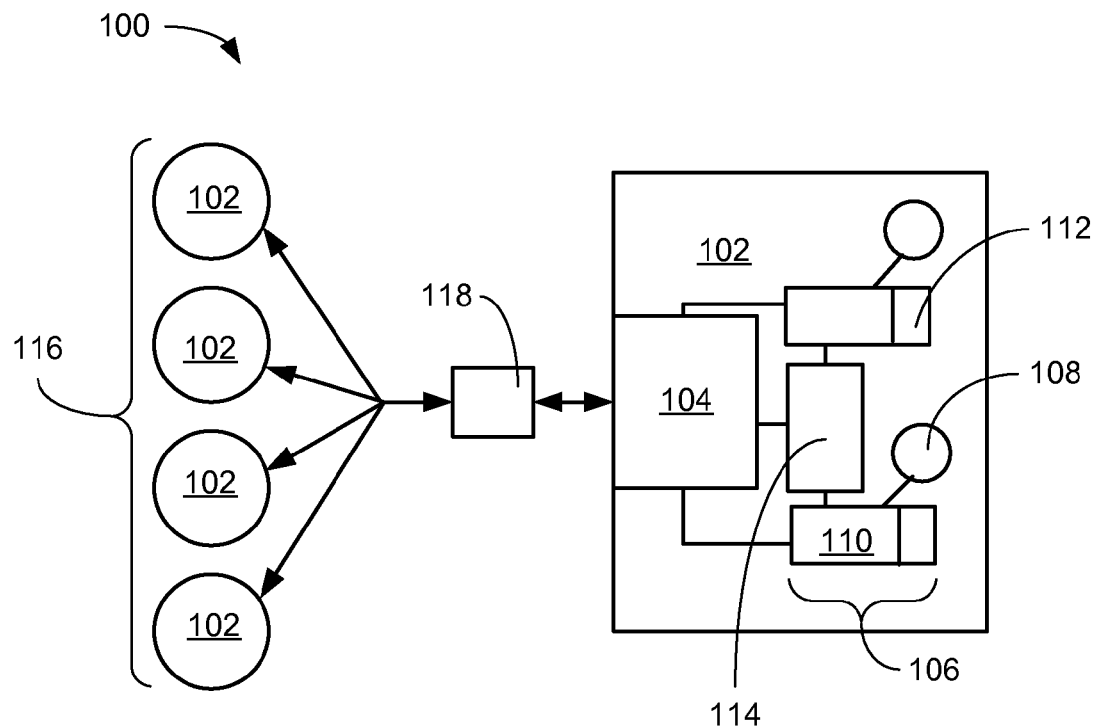
FIG. 1 is a block diagram of a computer system with concurrent direct memory access, in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the network interface controller printed circuit board, regardless of its orientation. The term "vertical" refers to a direction perpendicular to the horizontal as just defined. Terms, such as "above", "below", "bottom", "top", "higher", "lower", "upper", "over", and "under", are defined with respect to the horizontal plane. The term "on" means there is direct contact among elements.

Referring now to FIG. 1, therein is shown a block diagram of a computer system with concurrent direct memory access 100 with concurrent direct memory access, in an embodiment of the present invention. The block diagram of the computer system with concurrent direct memory access 100 depicts a computer node 102 having a network interface controller (NIC) 104, such as an Ethernet controller, optical interface controller, or RF interface controller, supported by a composite virtual NIC 106 that is linked to an application 108. The composite virtual NIC 106 comprises a virtual network interface controller (VNIC) 110 and a flow-control NIC 112, such as a control circuit. The NIC 104 and the VNIC 110 are coupled to a memory 114, such as a pinned memory within the system memory, for storing and sending messages. The pinned memory is any memory that is constantly dedicated to support a function, such as the NIC 104. The pinned memory may not be off-loaded to disk storage or virtual memory. The NIC 104 is coupled to a reliable network 118, which is further coupled to a plurality of other units of the computer node 102.

The NIC 104 is the physical interface controller. It sends and receives the electronic, optical, or RF signals between the reliable network 118 and other units of the computer node 102. Each of the applications 108 that utilize the services of the NIC 104 is assigned the composite virtual NIC 106. The composite virtual NIC 106 comprises a block of the memory 114 and a driver program. The composite virtual NIC 106 is made up of the VNIC 110, which manages the movement of messages and data between the NIC 104 and the application 108, and the flow-control NIC 112. The flow-control NIC 112 manages the utilization of the memory 114 in the VNIC 110 on the destination side of the reliable network 118. Collectively, all of the computer nodes 102 attached to the reliable network 118 may be considered a computer cluster 116 or the computer cluster 116 contains the reliable network 118.

The flow-control NIC 112 functions in circuitry that performs as the memory manager for the transfer of data for the application 108 to which it is linked. When the computer node 102 is initialized, the flow-control NIC 112 is assigned a unique identity for network communication. The unique identifier may consist of the MAC address of the NIC 104 and a port identifier associated with the VNIC 110. The memory 114 available to the VNIC 110 is equally divided into segments called credits. Usually a credit represents a sufficient amount of the memory to transfer a packet of data. When the application 108 wishes to transfer a large amount of data, the flow-control NIC 112 assembles a message that requests an additional block of credits sufficient to handle a portion or the entire data transfer.

Figure 2:
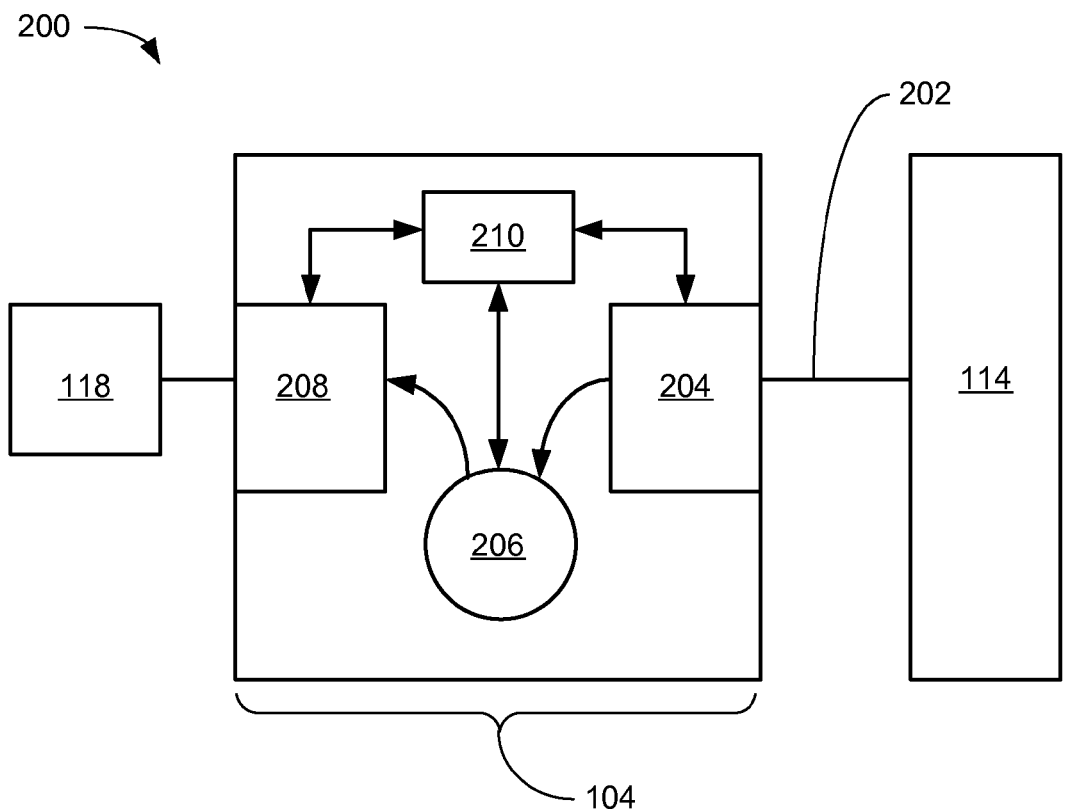
FIG. 2 is a block diagram of a transmit path of the computer system with concurrent direct memory access, of FIG. 1.

Referring now to FIG. 2, therein is shown a block diagram of a transmit path 200 of the computer system with concurrent direct memory access 100, of FIG. 1. The block diagram of the transmit path 200 depicts the reliable network 118 coupled to the NIC 104 and the NIC 104 is coupled to the memory 114. The memory 114 is coupled to the NIC 104 by a processor interface bus 202, such as a front side bus. A direct memory access (DMA) 204 is a circuit that receives the signals from the processor interface bus 202. The DMA 204 copies message data form the memory 114 to a transmit buffer 206. The transmit buffer 206 is a memory that acts as a temporary holding area for a NIC physical interface 208. The NIC physical interface 208 is the circuitry that is responsible for generating the signals that interact with the reliable network 118. A transfer processor 210 monitors the movement of the message date form the DMA 204 through the transmit buffer 206 to the NIC physical interface 208.

The DMA 204 starts a message transmission by copying the data from the memory 114 to the to the transmit buffer 206. When a sufficient amount of data is in the transmit buffer 206, the NIC physical interface 208 starts to transfer the data to the reliable network 118. The transfer is started prior to the arrival of all of the data that will be transferred. The DMA 204 can transfer the data at a much higher rate than the NIC physical interface 208. The transfer speed advantage that the DMA 204 possesses allows the NIC physical interface 208 to start the transfer earlier than a prior art version of the NIC 104, which would transfer all of the data into the transmit buffer 206 prior to the transfer to the reliable network 118.

The pipelining of these two transfers, the DMA 204 into the transmit buffer 206 and the NIC physical interface 208 out of the transmit buffer, becomes a calculated risk. The overwhelming probability is in favor of the DMA 204 transferring all of the message data into the transmit buffer 206 before the NIC physical interface 208 can transfer it out. As long as the last byte of the message is in the transmit buffer 206 before the NIC physical interface 208 finishes, the transfer will be successful and a significant amount of latency has been cut-through. The NIC 104 that displays these characteristics may be called the "cut-through network interface controller" 104.

The transfer processor 210 monitors the movement of the data through the transmit buffer 206. If for some reason, such as the memory 114 refresh or contention on the processor interface bus 202, the NIC physical interface 208 should overrun the transmit buffer 206, the transfer processor 210 would signal the error. In response to the error flagged by the transfer processor 210, the NIC physical interface 208 would end the message packet transmission with an error designator such as a framing error or a circular redundancy check (CRC) error. The error designator will cause the receiving device to reject and drop the packet.

The transfer processor 210 may continue to monitor the movement of the message data from the memory 114 to the transmit buffer 206. When all of the message data is located in the transmit buffer 206, the transfer processor 210 may cause the NIC physical interface 208 to re-transmit the packet. The re-transmit of the erroneous packet caused by the transfer processor 210 represents another significant reduction in latency over a software based re-transmission. The transfer protocol, such as EtherNet, takes a significant amount of time to declare the packet missing and request a re-transmission of the data. Upon the successful completion of the re-transmitted packet, the operation of the NIC physical interface 208 and the DMA 204 reverts back to the normal overlap of data fetch and data transmission.

Figure 3:
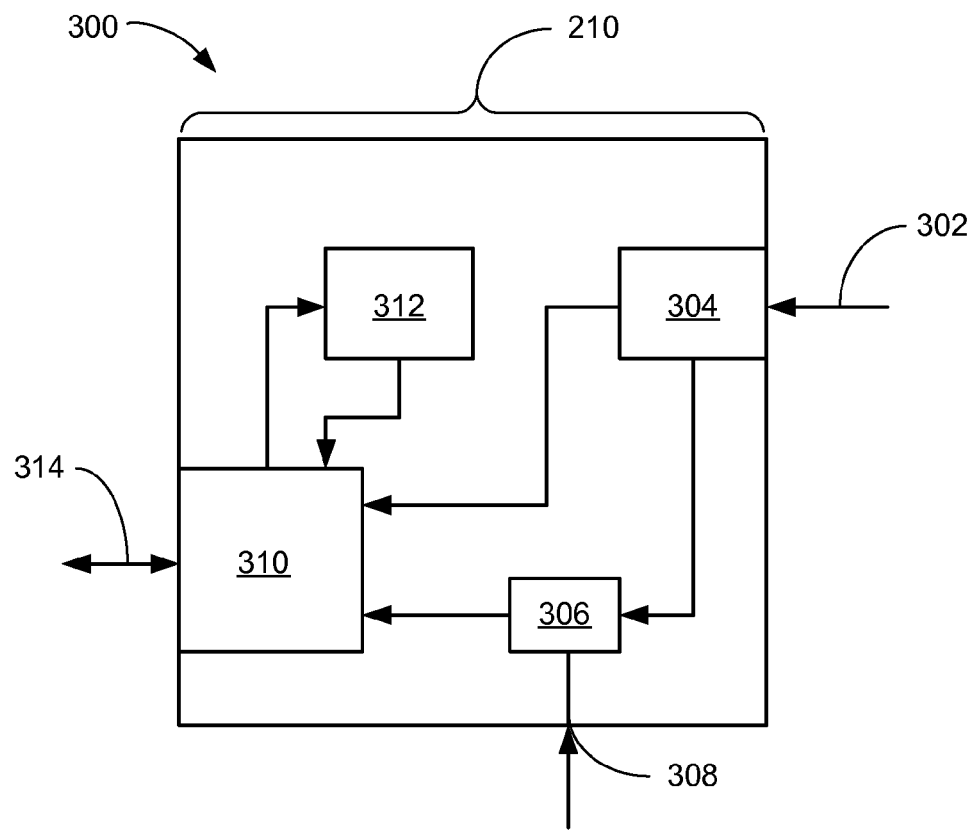
FIG. 3 is a block diagram of the transfer processor, of FIG. 2.

Referring now to FIG. 3, therein is shown a block diagram of the transfer processor 210, of FIG. 2. The block diagram depicts a DMA communication bus 302 coupled to a DMA interface 304. The DMA interface 304 is coupled to a buffer interface 306, which receives input from a buffer communication bus 308, and a NIC status manager 310. The NIC status manager 310 is coupled to a transmission monitor 312 and to the NIC physical interface 208, of FIG. 2, through a status communication bus 314.

The DMA interface 304 receives information from the DMA 204, of FIG. 2, through the DMA communication bus 302. The DMA interface 304 stores the details about the message that is to be transmitted, such as the total number of bytes and load status. Some of the information is passed to the NIC status manager 310 for transfer monitoring. The DMA interface 304 also passes load status and timing information to the buffer interface 306. The buffer interface 306 resolves any timing issues between the transmit buffer 206, of FIG. 2, being loaded by the DMA 204 while being read by the NIC physical interface 208. These events may happen concurrently in different locations of the transmit buffer without presenting an error. The buffer interface 306 receives input, from the buffer communication bus 308, regarding the buffer location being read by the NIC physical interface 208. This information is compiled and passed to the NIC status manager 310 for processing.

Signals from the status communication bus 314 are passed through the NIC status manager 310 to the transmission monitor 312 for synchronization and checking. In the vast majority of the transfers, the DMA 204 will provide all of the data to the transmit buffer 206 before the NIC physical interface 208 is near the end of the packet transfer. In this case the NIC status manager 310 presents an error free status to the NIC physical interface 208. A rare possibility is that the DMA 304 may not complete the transfer of data to the transmit buffer 206 prior to the NIC physical interface 208 reading beyond the current data pointer. In this case the buffer interface 306 would detect a buffer wrap error and flag the error to the NIC status manager 310.

The NIC status manager 310 communicates an error to the NIC physical interface 208, which terminates the packet transfer with an error designator such as a framing error or a CRC error. The framing error can be caused by sending an unusual number of bits, for example not an integer multiple of eight bits, and presenting an incorrect CRC at the end of the packet. The CRC error may also be presented without the framing error. When this packet is detected at the destination, it will be dropped without response. If the packet is delayed or never arrives, a packet timeout would occur at the TCP/IP software level causing the destination to again request the transmission of the packet. This could represent a substantial delay in the processing of the data.

In order to expedite the transfer and maintain the reduction in latency, the NIC status manager 310 may initialize the pointers in the NIC physical interface 208 and immediately enable the retransmission of the packet prior to a network timeout without an upper level software, such as a Transfer Control Protocol/Internet Protocol (TCP/IP), for support. Under normal circumstances the DMA 304 would resume the transfer and complete the loading of the transmit buffer 206 without additional interruption. If per chance a second occurrence of the buffer wrap error is presented, the packet will not be retransmitted without all of the data transferred into the transmit buffer. In the event of the second buffer wrap error, the buffer interface 306 continues to monitor the flow of data into the transmit buffer 206.

When all of the expected data resides in the transmit buffer 206, the buffer interface 306 signals the NIC status manager 310 to enable re-transmission of the entire packet. The NIC status manager 310 resets the transmit buffer pointers in the NIC physical interface 208 and once again enables the transfer of the data. The NIC physical interface 208 transfers all of the data in the packet then awaits the next transmission command. At the destination, the packet is received and is passed on without additional delay.

Figure 4:
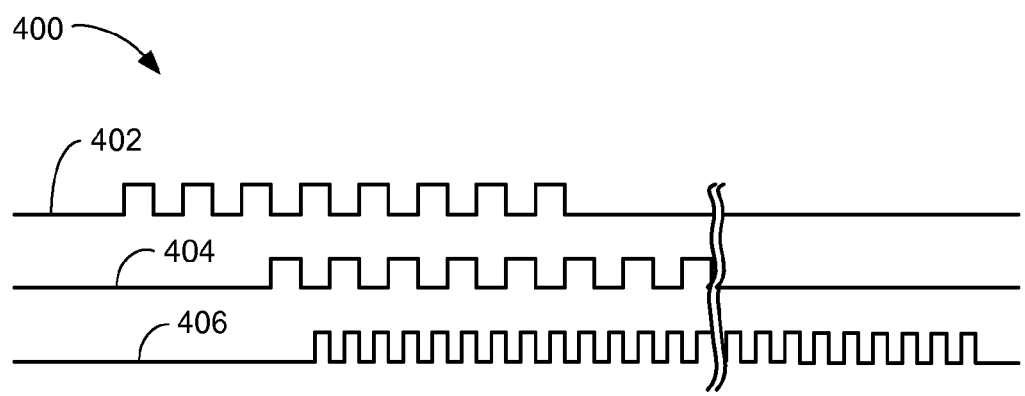
FIG. 4 is a timing diagram of the transmit buffer interface in a successful transmission of a message packet using the concurrent direct memory access.

Referring now to FIG. 4, therein is shown a timing diagram of the transmit buffer 206 interface in a successful transmission of a message packet using the concurrent direct memory access. The timing diagram depicts a DMA transfer signal 402, which in this example writes eight bytes of the data on each active edge of the signal. When the DMA transfer signal 402 has loaded a sufficient number of bytes into the transmit buffer 206, of FIG. 2, a NIC read signal 404 commences to transfer data from the transmit buffer 206 to the NIC physical interface 208, of FIG. 2. The NIC read signal 404 may transfer a single byte of data into the NIC physical interface 208 for transfer to the reliable network 118, of FIG. 1. A network driver signal 406 is activated shortly after the first byte of data is loaded into the NIC physical interface 208. The network driver signal 406 cycles one time for each bit sent across the network interface. As such there will be eight cycles of the network driver signal for every byte of data that is transferred.

The DMA transfer signal 402 will complete the transfer of data to the transmit buffer 206 well before the NIC read signal 404 can transfer the contents of the transmit buffer 206 to the NIC physical interface 208. The NIC read signal 404 may operate in a burst mode as well. Typically after an initial burst of the NIC read signal 404 that fills the pipeline, a single cycle of the NIC read signal 404 may occur for every eight cycles of the network driver signal 406. The network driver signal 406 will run constantly without pause as long as data is being transferred.

By way of example only, the timing diagram shows a burst of the DMA transfer signal 402 indicating a burst transfer of 64 bytes to the transmit buffer and the NIC read signal 404 starting after 24 bytes have been loaded into the transmit buffer. The actual number of bytes transferred by the DMA 204, of FIG. 2, may be different. As well the number of bytes transferred by the DMA transfer signal 402 and the NIC read signal 404 may be different. The starting threshold for initiating the transfer to the NIC physical interface 208 may different from 24, as any combination that represents the lowest latency and best system performance may be chosen.

Figure 5:
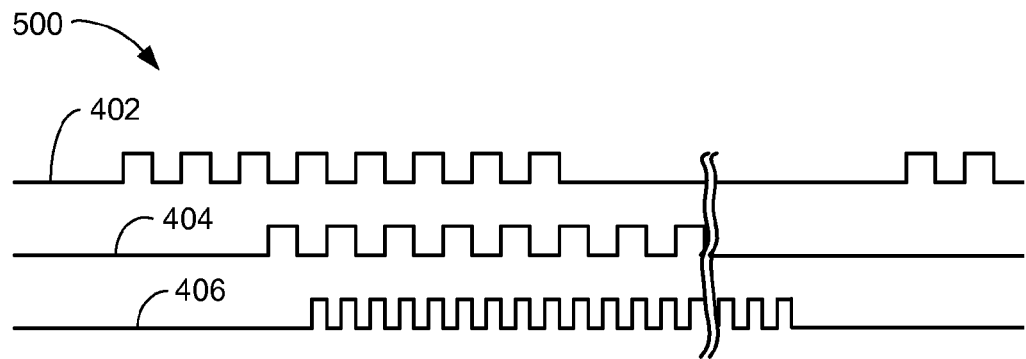
FIG. 5 is a timing diagram of the transmit buffer interface in an error condition during the transmission of a message packet using the concurrent direct memory access.

Referring now to FIG. 5, therein is shown a timing diagram of the transmit buffer interface in an error condition during the transmission of a message packet using the concurrent direct memory access. The timing diagram depicts the DMA transfer signal 402, which in this example writes eight bytes of the data on each active edge of the signal. When the DMA transfer signal 402 has loaded a sufficient number of bytes into the transmit buffer 206, of FIG. 2, the NIC read signal 404 commences to transfer data from the transmit buffer 206 to the NIC physical interface 208, of FIG. 2. The NIC read signal 404 may transfer a single byte of data into the NIC physical interface 208 for transfer to the reliable network 118, of FIG. 1. The network driver signal 406 is activated shortly after the first byte of data is loaded into the NIC physical interface 208.

In this example, the DMA transfer signal 402 is paused for an extended period of time after the initial data is loaded into the transmit buffer 206, of FIG. 2. The pause of the DMA transfer signal may be caused by the memory 114, of FIG. 1, entering a refresh cycle or contention on the processor interface bus 202, of FIG. 2. As the NIC read signal 404 transfers data from the transmit buffer 206, it will eventually deplete the data in the transmit buffer 206 and stall the transfer of data to the network driver signal 406. When the transmit buffer 206 is depleted of data, an error is detected and the transmission of the current packet is abruptly ended with an error designator such as a framing error or a CRC error.

When this packet is received at the destination, the error designator will be detected and the packet will be discarded without further action. The computer node 102, of FIG. 1, at the destination relies on the TCP/IP software level timeout to monitor expected responses from the reliable network 118, of FIG. 1.

The DMA transfer signal 402 will eventually resume transfer and complete the transfer of the data to the transmit buffer 206. Once all of the data has been transferred into the transmit buffer 206, the NIC physical interface 208 is signaled to re-transmit the packet. The re-transmission of the packet may occur prior to the TCP/IP software level timeout on the computer node 102 at the destination, thus preventing any additional packet exchanges across the reliable network 118, of FIG. 1.

Figure 6:
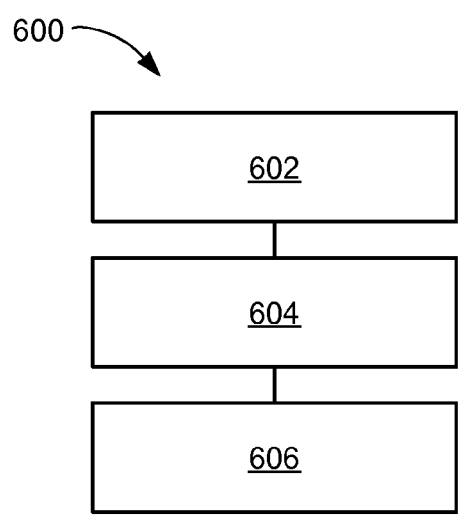
FIG. 6 is a flow chart of a method for performing a concurrent direct memory access in a computer system with concurrent direct memory access in an embodiment of the present invention.

Referring now to FIG. 6, therein is shown a flow chart of an embodiment of a method 600 for performing a concurrent direct memory access in a computer system with concurrent direct memory access. The method embodiment 600 is discussed in the context of FIGS. 1, 2 and 3 for illustrative purposes. As discussed with respect to FIG. 1, when the application 108 is to transfer a large amount of data, the flow-control NIC 112 assembles a message which to initiate the transfer of data between the memory 114 through the cut-through network interface controller 104. Via signals from the processor interface bus 202, the direct memory access circuit 204 moves 602 data from a memory 114 to a transmit buffer 206 in the cut-through network interface controller 104. The network interface controller physical interface 208 transmits 604 the data, to the computer node 102 attached to a reliable network 118, before all of the data is in the transmit buffer 206. Responsive to overrun of data in the transmit buffer 206, the transfer processor 210 signals 606 an error causing the NIC physical interface 208 to send the message packet transmission with an error designator.

In one aspect, the cut-through NIC of the present invention delivers a significant reduction in latency and provides enhanced performance in an aggregate data transfer. Additionally, the present invention provides lower latency, lower overhead and increased performance as compared to prior art network interface controllers.

In another aspect of the present invention, by carefully positioning the network interface system, for example by coupling it to the front side bus, a dramatic performance increase is possible.

Yet another important aspect of the present invention is that it valuably supports and services the historical trend of reducing costs, simplifying systems, and increasing performance.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for performing a concurrent direct memory access in a computer system comprising:

moving data from a memory to a transmit buffer with a direct memory access in a network interface controller;

transmitting the data before all of the data is in the transmit buffer;

in response to an overrun of the data in the transmit buffer, signaling an error designator, the error designator signaled by a transmitting device of which the network interface controller is a part to a receiving device, the error designator indicating to the receiving device to reject a data packet encompassing data that the receiving device has already received from the transmitting device and that is subject to the overrun in the transmit buffer, the data packet encompassing the data transmitted to the transmit buffer, the receiving device being a device separate from the transmitting device;

terminating the data packet with the error designator upon detecting a buffer wrap error of the transmit buffer, by a network interface controller status manager; and after the data packet with the error designator has been terminated, automatically retransmitting the data of the data packet from the transmitting device to the receiving device without waiting for the receiving device to declare the data packet missing pursuant to a network timeout and pursuant to a network transfer protocol, the data of the data packet being automatically retransmitted without the receiving device requesting retransmission of the data of the data packet.

2. The method as claimed in claim 1 further comprising monitoring the transmit buffer for the overrun of the data, by a transfer processor.

3. The method as claimed in claim 1 further comprising monitoring the data moving through the transmit buffer.

4. A method for performing a concurrent direct memory access in a computer system comprising:

moving data from a memory to a transmit buffer with a direct memory access in a cut-through network interface controller, including moving data from a pinned memory within a system memory;

transmitting the data before all of the data is in the transmit buffer, including transmitting the data across a network interface controller physical interface of the cut-through network interface controller;

in response to an overrun of the data in the transmit buffer, signaling an error designator, including signaling the error designator to the network interface controller physical interface of the cut-through network interface controller, the error designator signaled by a transmitting device of which the cut-through network interface controller is a part to a receiving device, the error designator indicating to the receiving device to reject a data packet encompassing data that the receiving device has already received from the transmitting device and that is subject to the overrun in the transmit buffer, the data packet encompassing the data transmitted to the transmit buffer, the receiving device being a device separate from the transmitting device;

terminating the data packet with the error designator upon detecting a buffer wrap error of the transmit buffer, including terminating, by a network interface controller status manager, with the error designator to the network interface controller physical interface; and after the data packet with the error designator has been terminated, automatically retransmitting the data of the data packet from the transmitting device to the receiving device without waiting for the receiving device to declare the data packet missing pursuant to a network timeout and pursuant to a network transfer protocol, the data of the data packet being automatically retransmitted without the receiving device requesting retransmission of the data of the data packet.

5. The method as claimed in claim 4 further comprising monitoring the transmit buffer for the overrun of the data, by a transfer processor including monitoring transfer of the data packet and retransmitting the data packet without an upper level software support of the computer system.

6. The method as claimed in claim 4 further comprising monitoring the data moving through the transmit buffer, including monitoring a buffer communication bus of the network interface controller for receiving an input from the transmit buffer.

7. A computer system with concurrent direct memory access comprising:
   a computer node having a processor interface bus;
      a cut-through network interface controller on the processor interface bus for transferring of a data packet including:
      a transmit buffer in the cut-through network interface controller;
      a direct memory access circuit in the cut-through network interface controller for moving data from a memory to the transmit buffer; and
      a network interface controller physical interface for starting the transfer of the data packet before all of the data packet is in the transmit buffer,
      wherein the cut-through network interface controller is, in response to an overrun of data in the transmit buffer, signal an error designator, the error designator signaled by a transmitting device of which the cut-through network interface controller is a part to a receiving device, the error designator indicating to the receiving device to reject the data packet encompassing data that the receiving device has already received from the transmitting device and that is subject to the overrun in the transmit buffer, the receiving device being a device separate from the transmitting device; and,
      after the data packet with the error designator has been terminated, automatically retransmit the data packet from the transmitting device to the receiving device without waiting for the receiving device to declare the data packet missing pursuant to a network timeout and pursuant to a network transfer protocol, the data packet being automatically retransmitted without the receiving device requesting retransmission of the data packet; and
      a transfer processor coupled to the network interface controller physical interface by a status communication bus for terminating the data packet with the error designator when a buffer wrap error of the transmit buffer is detected.

8. The system as claimed in claim 7 further comprising a transfer processor in the cut-through network interface controller including:
   a direct memory access interface;
   a direct memory access communication bus coupled to the direct memory access interface;
   a buffer communication bus of the cut-through network interface controller;
   a buffer interface coupled to the direct memory access interface and the buffer communication bus, for monitoring the data packet in the transmit buffer;
   a transmission monitor of the cut-through network interface controller;
   a status communication bus of the cut-through network interface controller; and
   a network interface controller status manager, coupled to the transmission monitor, the status communication bus, the buffer interface, and the direct memory access interface.

9. The system as claimed in claim 7 further comprising a buffer communication bus between the transmit buffer and a buffer interface within a transfer processor.

10. The system as claimed in claim 7 further comprising a buffer interface for monitoring data of the data packet moved through the transmit buffer.

11. The system as claimed in claim 7 wherein:
   the computer node having a system memory with a pinned memory; and
   the cut-through network interface controller having a direct memory access interface and a transfer processor, with a buffer interface coupled to the transmit buffer for monitoring the data in the transmit buffer.

12. The system as claimed in claim 11 wherein the network interface controller physical interface coupled to a network interface controller status manager, for retransmitting the data packet after an error is detected, includes the data packet retransmitted with no upper level software support of the computer system.

13. The system as claimed in claim 11 wherein the transfer processor includes:
   a direct memory access interface;
   a direct memory access communication bus coupled to the direct memory access interface for managing the parameters of the data packet;
   a buffer communication bus of the cut-through network interface controller;
   a buffer interface coupled to the direct memory access interface and the buffer communication bus, for monitoring the data packet in the transmit buffer;
   a transmission monitor of the cut-through network interface controller;
   a status communication bus of the cut-through network interface controller; and
   a network interface controller status manager, coupled to the transmission monitor, the status communication bus, the buffer interface, and the direct memory access interface, for terminating and retransmitting the data packet.

14. The system as claimed in claim 11 wherein the transfer processor having a buffer communication bus coupled between the transmit buffer and the buffer interface, for detecting a buffer wrap error of the transmit buffer.

* * * * *